United States Patent
Yatsui (10) Patent No.: US 8,413,492 B1
(45) Date of Patent: Apr. 9, 2013

(54) CYLINDER SLEEVE SURFACE MEASUREMENT ASSEMBLY

(75) Inventor: Mori W. Yatsui, N. Saint Petersburg, FL (US)

(73) Assignee: Honda Motor Co., Ltd., Tokyo (JP)

( * ) Notice: Subject to any disclaimer, the term of this patent is extended or adjusted under 35 U.S.C. 154(b) by 691 days.

(21) Appl. No.: 12/604,723

(22) Filed: Oct. 23, 2009

(51) Int. Cl.
G01B 5/28 (2006.01)

(52) U.S. Cl.
USPC ............ 73/105; 73/866.5; 33/600; 33/655; 33/542; 33/551; 33/572

(58) Field of Classification Search ............ 73/104, 73/105, 866.5; 33/501.8, 533, 542, 543, 33/549, 550, 551, 567, 572, 600, 655
See application file for complete search history.

(56) References Cited

U.S. PATENT DOCUMENTS

| | | | |
|---|---|---|---|
| 2,404,143 A | | 7/1946 | Reason |
| 2,599,835 A | * | 6/1952 | Johnson et al. ............. 33/542 |
| 2,691,887 A | * | 10/1954 | Rinker ....................... 73/105 |
| 2,772,565 A | * | 12/1956 | Brown, Jr. et al. ............. 73/105 |
| 3,646,685 A | * | 3/1972 | Goodenough ............... 33/542 |
| 3,808,696 A | * | 5/1974 | Possati ....................... 33/544.5 |
| 4,112,355 A | * | 9/1978 | Gibson et al. ............... 324/662 |
| 4,393,698 A | * | 7/1983 | Pietzsch et al. ............ 73/114.77 |
| 4,765,181 A | | 8/1988 | Numoto et al. |
| 4,776,212 A | | 10/1988 | Parsons et al. |
| 4,872,269 A | * | 10/1989 | Sattmann ..................... 33/552 |
| 6,026,678 A | | 2/2000 | Mamaysky et al. |
| 6,164,124 A | | 12/2000 | Fujii et al. |
| 6,446,496 B1 | | 9/2002 | Fujii et al. |
| 6,487,897 B1 | | 12/2002 | Fujii et al. |
| 2009/0025464 A1 | | 1/2009 | Ishii |

FOREIGN PATENT DOCUMENTS

| | | | |
|---|---|---|---|
| DE | 4437033 | | 4/1996 |
| DE | 19641719 | | 4/1998 |
| EP | 1887311 | | 2/2008 |
| JP | 11-248404 | | 9/1999 |
| JP | 2002-277203 | | 9/2002 |
| SU | 1404789 | * | 6/1988 |
| SU | 1758409 | | 8/1992 |

* cited by examiner

Primary Examiner — Daniel Larkin
(74) Attorney, Agent, or Firm — Rankin, Hill & Clark LLP (57) ABSTRACT

A cylinder sleeve surface measurement assembly for measuring a surface roughness of a cylinder sleeve, especially a cylinder sleeve formed in an engine block. The assembly includes a fixture that holds a surface profiling device. The surface profiling device is provided with a stylus that perpendicularly projects from a measuring arm, and the fixture holds the surface profiling device such that the stylus remains in perpendicular contact with the surface of the cylinder sleeve. To ensure perpendicular contact, the fixture is provided with an arcuate surface that defines an arc matching that of a portion of the cylinder sleeve. Accordingly, the arcuate surface allows the measuring arm to remain parallel to a surface of the cylinder sleeve, thereby ensuring that the stylus remains perpendicular thereto.

17 Claims, 6 Drawing Sheets

CYLINDER SLEEVE SURFACE MEASUREMENT ASSEMBLY

BACKGROUND

The present disclosure relates to measuring systems and devices, and more particularly to an engine block cylinder sleeve surface measurement system and device. In the typical manufacture of an engine block, several engine cylinders are formed, each of which is defined by a cylinder sleeve. Among other operations involved in forming the cylinder sleeves, the cylinder sleeves must be machined so as to smooth the surfaces thereof. Following the machining, an operation of measuring the surface roughness of the cylinder sleeves is usually carried out to ensure proper machining.

To measure the surface roughness of the cylinder sleeves, a device for measuring the surface roughness is typically placed in or near the cylinder sleeves. However, given the shape of the engine block and the relative positions of the cylinder sleeves thereon, the use of such devices can sometimes be difficult and imprecise, or can sometimes require expensive and inefficient assemblies.

SUMMARY

According to one aspect, an improved hand-held cylinder sleeve measurement assembly comprises a surface profiling device having a stylus for measuring surface roughness and a fixture for holding the surface profiling device. The fixture is an elongated body that includes an arcuate surface configured to be flush with an inner surface of the cylinder sleeve, and further includes a holding portion for holding the surface profiling device while allowing the surface profiling device to measure the roughness of the surface of the cylinder sleeve. The arcuate surface and the holding portion of the fixture cooperate to maintain perpendicular contact between a stylus of the surface profiling device and the cylinder sleeve.

The assembly operates by having an inserting portion of the assembly inserted into the cylinder sleeve so that the arcuate surface rests flush against the cylinder sleeve. Once inserted, the assembly is rotated around the cylinder sleeve so as to allow the surface profiling device to measure the roughness of the cylinder sleeve surface. Preferably, the surface profiling device can also measure the surface roughness by moving in a longitudinal direction of the cylinder sleeve.

DETAILED DESCRIPTION

A cylinder sleeve measurement assembly will be described herein with reference to the appended figures. A person having ordinary skill in the art will recognize that the description is made with reference to the figures so as to exemplify the assembly disclosed herein. As such, the description with reference to the figures is not intended to further limit the scope of the disclosure.

Figure 1A:
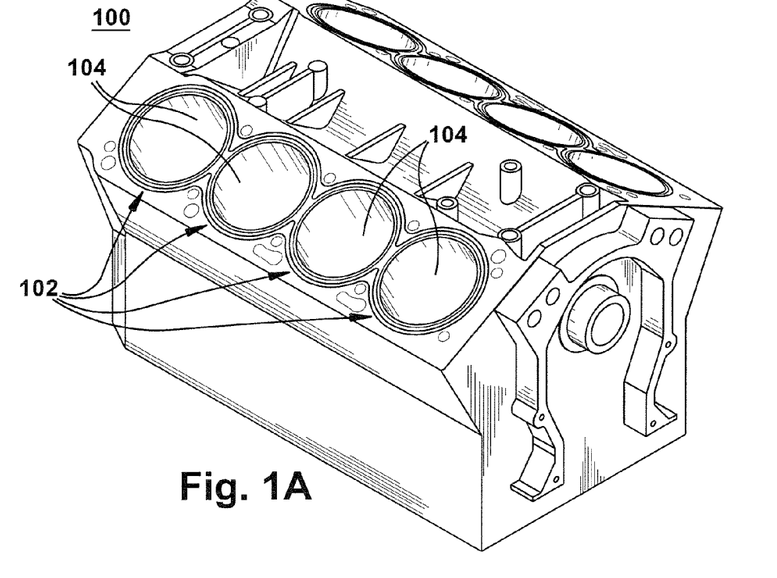
FIG. 1A is a perspective view of an engine block having a plurality of cylinders, each with a cylinder sleeve.

Beginning with FIG. 1A, an engine block 100 having eight cylinders 102, each of which defined by a cylinder sleeve 104, is shown. As used herein, the term "cylinder sleeve" refers to the inner rounded surface of the cylinders 102. The cylinder sleeves 104 are formed of a continuous surface that defines a circular cross-section, as can be ascertained with reference to FIG. 1B. Further, as used herein, the "longitudinal direction" of the cylinder sleeve 104 refers to a direction into and out of the cylinder sleeve 104, or a left and right direction in FIG. 1C. Meanwhile, the "transverse direction" of the cylinder sleeve 104 refers to a direction orthogonal to the longitudinal direction. In other words, the transverse direction of the cylinder sleeve 104 is a direction that results in the drawings of an arc along the cylinder sleeve 104 edges.

In the manufacture of the cylinder sleeves 104, for proper engine operation, it is usually preferred that the cylinder sleeves 104 are machined so as to have smooth surfaces. Particularly, the cylinder sleeves 104 can be machined so as to have a surface roughness that falls within predetermined specifications. To ensure that the cylinder sleeve 104 surface roughness meets the predetermined specifications, a surface roughness of the cylinder sleeves 104 can be measured using a surface profiling device. Two examples of surface profiling devices are a "Talysurf" and a "Profilometer" device.

Figure 1B:
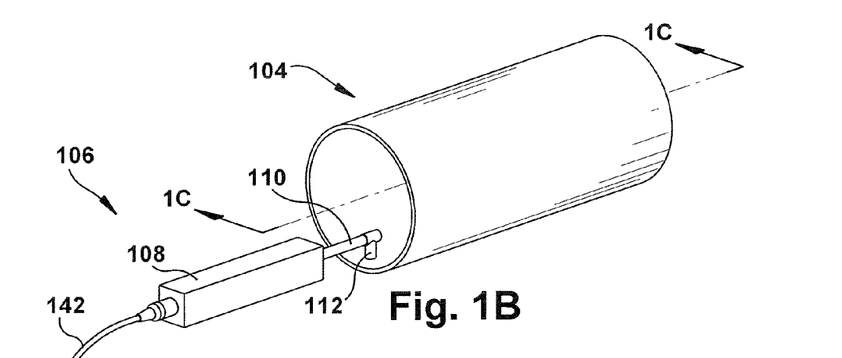
FIG. 1B is a perspective view illustrating a surface profiling device measuring a surface roughness of one of the cylinder sleeves.
Figure 1C:
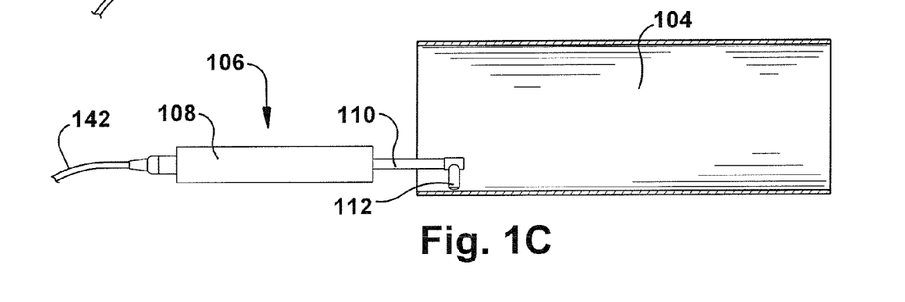
FIG. 1C is a sectional view along the line 1C-1C shown in FIG. 1B.

As shown in FIGS. 1B and 1C, an exemplary surface profiling device 106 is formed of a base member 108 and a measuring arm 110 that supports a stylus 112. To measure the surface roughness, the surface profiling device base member 108 is held near the cylinder sleeve 104 such that the measuring arm 110 projects into the cylinder sleeve 104 and a tip of the stylus 112 is in contact with the cylinder sleeve 104. The surface profiling device 106 is then moved such that the stylus 112 drags across the cylinder sleeve 104. As the stylus drags across the cylinder sleeve 104, the stylus 112 minutely deflects in a variable manner based on the surface roughness of the cylinder sleeve 104. By detecting the minute deflections of the stylus 112, a measurement for the roughness of the cylinder sleeve 104 is captured. Specifically, the deflection of the stylus 112 is captured, recorded, and processed by a central processing unit (CPU) 114 that is connected to the surface profiling device 106. A more detailed description of the configuration of the surface profiling device 106 is provided below.

As is appreciated by a person of ordinary skill in the art, the stylus 112 is necessarily sensitive to any minute deflections in order to be able to sense a surface roughness. Thus, it is important that the only deflections of the stylus 112 are caused by variances in the surface roughness of the cylinder sleeve 104. Accordingly, the stylus 112 must remain perpendicular to the cylinder sleeve 104 and in contact with the cylinder sleeve 104 with a constant pressure. In other words, the parallelism of the base member 108 and measuring arm 110 with an axis of the cylinder sleeve 104 is preferably maintained.

However, maintaining the parallelism during hand-held operation of the surface profiling device 106 can be difficult, as a human operator cannot move the surface profiling device 106 while maintaining the parallelism. The parallelism is improved through the use of machine-operated surface profiling devices. However, such devices need to be specially manufactured to measure the cylinder sleeves 104 of an engine block 100. Further, machine-operated surface profiling devices require the engine block 100 to be specially placed in a set location for measurement using the machine-operated device. Thus, in addition to being expensive to specially manufacture, machine-operated surface profiling devices require special material handling operations in order to allow for surface roughness measurement of the cylinder sleeves 104.

Accordingly, a cylinder sleeve surface measurement assembly 116 (hereinafter, "assembly") is provided that allows for precise hand-held surface roughness measurement of an engine cylinder sleeve 104. Specifically, as will become clear with reference to the below description, the assembly 116 allows for the precision of a machine-operated device coupled with the efficiency of a hand-held device.

Figures 7, 8:
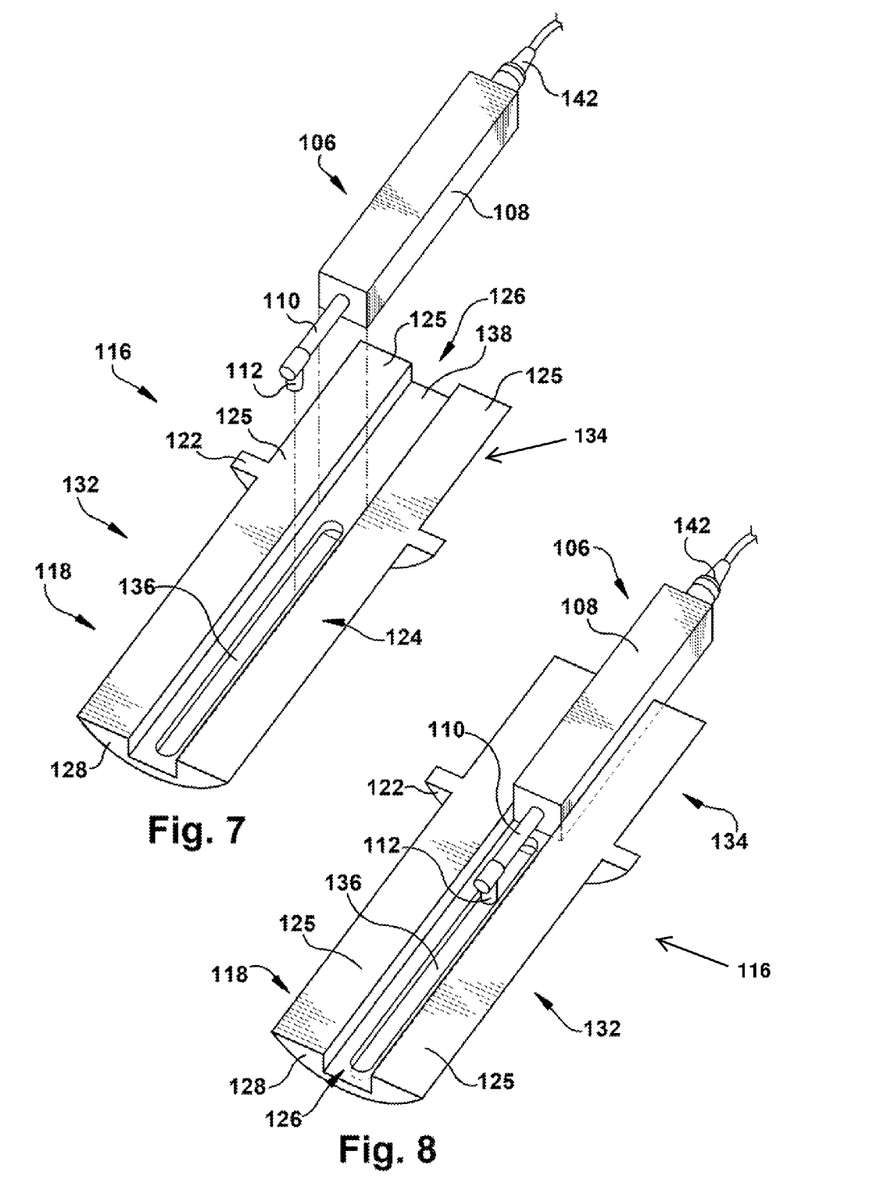
FIG. 7 is an exploded perspective view of the surface profiling device and the fixture for holding the surface profiling device.
FIG. 8 is a perspective view of the surface profiling device and the fixture for holding the surface profiling device.

With reference to FIGS. 7 and 8, the assembly 116 of the illustrated embodiment includes the surface profiling device 106 and a fixture 118 that holds and secures the surface profiling device 106. Further, the fixture 118 is operable to locate a surface profiling device 106 within a cylinder sleeve 104 such that the parallelism of the surface profiling device 106 with the axis of the cylinder sleeve 104 is ensured.

The illustrated fixture 118, shown in isolation in FIGS. 2-5, is an elongated body configured to have at least a portion thereof inserted into the cylinder sleeve 104. For ease of explanation, the fixture 118 will be described as having a top surface and a bottom surface, with the "top" and "bottom" surfaces referencing the relative positions of the respective surfaces of the fixture 118 in the figures. Moreover, it is noted that the "bottom" surface also refers to a surface of the fixture 118 having at least a portion thereof in direct contact with the cylinder sleeve 104.

The elongated body of the fixture 118 includes an arcuate fitting surface 120, a stop ridge 122 projecting orthogonally from the arcuate fitting surface 120, and a non-arcuate holding portion or surface 124 including a holding channel 126 defined in the fixture 118. The fixture 118 is also defined by planar, wedge shaped end faces 128, 130. In particular, a first end face, i.e., an inserted end 128, and a second end face, i.e., an operating end 130, are disposed at opposite longitudinal ends of the fixture 118. In addition to being defined by the above elements, the fixture 118 can also be described as being divided into two longitudinal portions based upon the operating characteristics of each longitudinal portion. The two longitudinal portions are a fixture inserting portion 132 and a fixture operating portion 134.

In the illustrated embodiment, the arcuate fitting surface 120 is a bottom surface of the fixture 118 and defines a rounded arc shape in a transverse direction. The arc defined by the arcuate fitting surface 120 can be sized and shaped so as to match an arc portion of the circular cross section of the cylinder sleeve 104. As such, when the fixture 118 is inserted into the cylinder sleeve 104, the arcuate fitting surface 120 rests flush against the cylinder sleeve 104.

The non-arcuate holding portion or surface 124 is a top surface of the fixture 118 and defines a plurality of faces (e.g., three faces) extending in the longitudinal direction of the fixture 118. Two elevated faces 125 are disposed at transverse ends of the non-arcuate holding surface 124 and are spaced from one another by the holding channel 126. The elevated faces 125 are level with one another in a height direction of the fixture 118. Inner ends of the elevated faces 125 define edges of the holding channel 126, which is an indent extending from the elevated faces 125 toward the arcuate fitting surface 120. As such, the holding channel 126 is generally a block U-shaped channel defined by a pair of vertical walls extending perpendicularly downward from the edges of the elevated faces 125, and a bottom surface 138 that is parallel to the two elevated faces 125. Further, the holding channel 126 extends between the inserted surface 128 and the operated surface 130. As such, both the inserted surface 128 and the operated surface 130 include an open, generally rectangular indent.

As will be described below, the holding channel 126 is configured to hold the surface profiling device 106. For such holding, the bottom surface 138 has a width (in the transverse direction) that is substantially equal to a transverse width of the base member 108 of the surface profiling device 106. Additionally, the height of the base member 108 is greater than a height of the holding channel 126, where the height of the holding channel 126 is defined by a distance between the holding channel bottom surface 138 and the elevated faces 125. As such, the base member 108 can fit snuggly in the holding channel 126.

Figures 2A, 2B, 3, 4, 5:
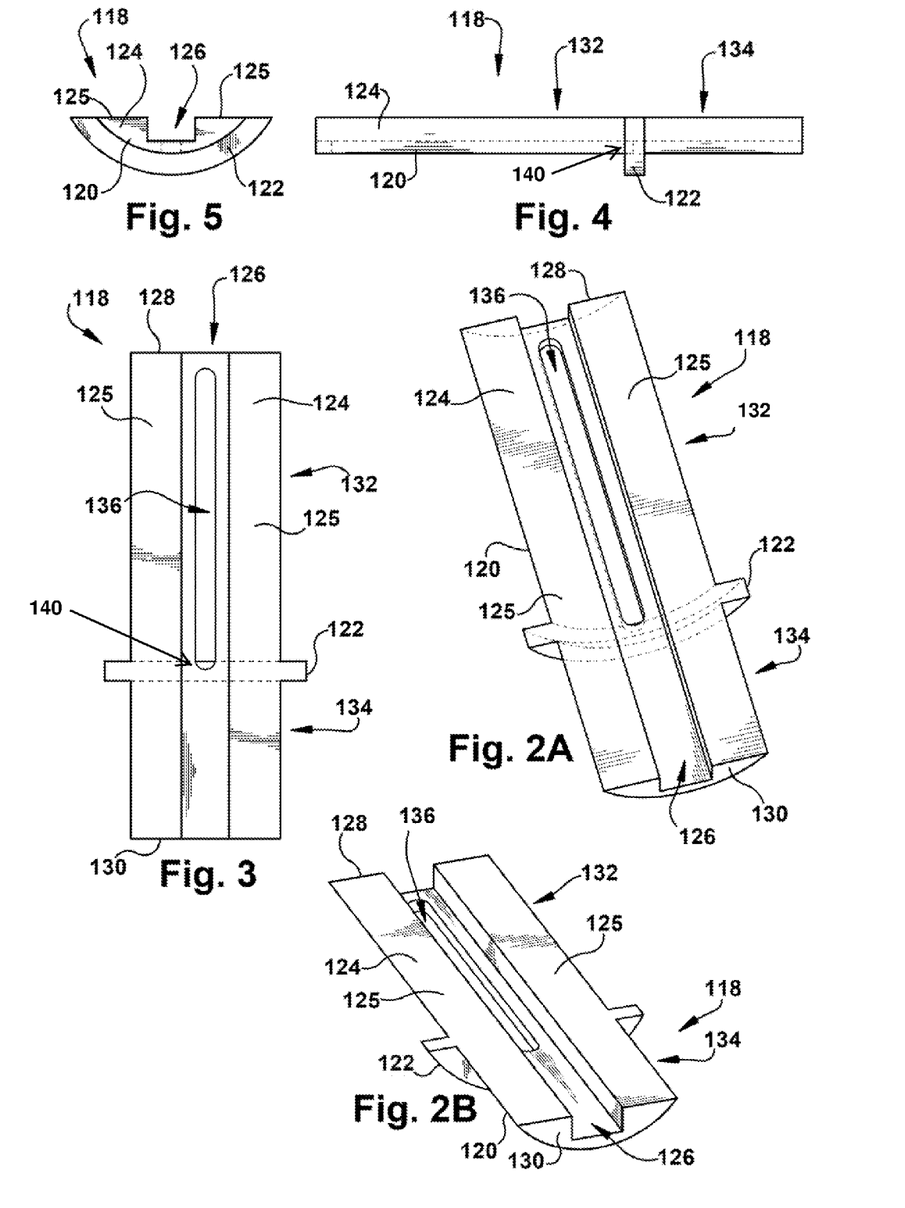
FIG. 2A is an elevated perspective view of a fixture for holding the surface profiling device.
FIG. 2B is a second perspective view of the fixture for holding the surface profiling device.
FIG. 3 is a plan view of the fixture for holding the surface profiling device.
FIG. 4 is a side view of the fixture for holding the surface profiling device.
FIG. 5 is a front view of the fixture for holding the surface profiling device.

The arcuate fitting surface 120 and the non-arcuate holding surface 124, including the elevated faces 125 and the holding channel 126, define the shapes of the inserted surface 128 and the operated surface 130. FIG. 5 illustrates a front view of the fixture 118 looking directly at the operated surface 130. Though the operated surface 130 is illustrated, it will be appreciated that the inserted surface 128 can be identical to the operated surface 130. Accordingly, the depiction of FIG. 5 could also be used to illustrate a rear view of the fixture 118 looking directly at the inserted surface 128.

As shown, the operated surface 130 has a wedge shape, with an arcuate bottom surface and a generally planar profile for the top surface. The arcuate bottom surface is defined by the arcuate fitting surface 120, while the generally planar top surface is defined by the two elevated faces 125 and the holding channel 126 including the two vertical walls and the bottom surface 138 that is parallel to the two elevated faces 125. Accordingly, the operated surface 130 has a rounded, arc-shaped bottom surface, and a pair of elevated horizontal surfaces separated by the holding channel 126 as the top surface. The inserted surface 128 has the same shape.

To facilitate the operation of the assembly 116 in manner that will be further explained below, the stop ridge 122 orthogonally projects from the arcuate fitting surface 120. The stop ridge 122 is a narrow ridge that orthogonally projects from the arcuate fitting surface 120 such that a first end of the stop ridge 122 coincides with a first transverse end of the arcuate fitting surface 120 and a second end of the stop ridge 122 coincides with a second transverse end of the arcuate fitting surface 120. As used herein, the first and second transverse ends of the arcuate fitting surface 120 are the ends where the arcuate fitting surface 120 connects to the non-arcuate holding surface 124. Accordingly, as shown in FIGS. 2A, 2B, and 3, transverse ends of the stop ridge 122 merge or blend into the non-arcuate holding surface elevated faces 125.

The stop ridge 122 defines an arc that is larger than that defined by the arcuate fitting surface 120. Consequently, the arc defined by the stop ridge 122 is also larger than an arc portion defined by the cylinder sleeve 104. Thus, when a portion of the fixture 118 is axially inserted into the cylinder sleeve 104, the stop ridge 122 will eventually abut the cylinder sleeve 104 and thereby prevent any further insertion of the fixture 118 into the cylinder sleeve 104. Accordingly, the stop ridge 122 operates to prevent further entry of the fixture 118 into the cylinder sleeve 104 at a set point, or to precisely locate the surface profiling device 106, as will be apparent in the description below.

To set the position where further entry of the fixture 118 into the cylinder sleeve 104 is prevented, the position of the stop ridge 122 can be controlled. Specifically, a vertical edge of the stop ridge 122 nearest the inserted surface 128 of the fixture can be disposed in a longitudinal position of the fixture 118 such that a portion of the fixture 118 is allowed to enter the cylinder sleeve 104 so the surface profiling device 106 can perform the measurement operations required therein. The portion of the fixture 118 that is intended to be inserted into the cylinder sleeve 104 is the fixture inserting portion 132.

In this way, the stop ridge 122 demarcates a separation between the fixture inserting portion 132 and the fixture operating portion 134. The fixture inserting portion 132 is the portion that is to be inserted into the cylinder sleeve 104, along with at least a portion of the surface profiling device 104, while the fixture operating portion 134 is the portion that remains outside of the cylinder sleeve 104 so as to allow the operator to rotate the assembly 116 within the cylinder sleeve. Specifically, the fixture inserting portion 132 is the portion of the fixture 118 between the inserted surface 128 and a vertical surface of the stop ridge 122 nearest the inserted surface 128, while the fixture operating portion 134 is the portion of the fixture 118 between the operated surface 130 and the stop ridge 122.

As illustrated herein, the stop ridge 122 of the illustrated embodiment is positioned such that the fixture inserting portion 132 has twice the length of the operating portion 134. In other words, two-thirds of the fixture 118 is the inserting portion 132 and one-third is the operating portion 134. It will be appreciated that these proportions can be readily changed while remaining within the scope of the instant disclosure. As an example, the longitudinal proportion of the inserting portion 132 can range between 0-100% of the length of the fixture 118.

To allow the surface profiling device 106 to communicate with the cylinder sleeve 104 once held by the fixture 118, the fixture 118 further defines a measurement opening 136 through the holding channel bottom surface 138 and the arcuate fitting surface 120. The measurement opening 136 is an elongated opening extending the majority of the longitudinal length of the inserting portion 132. The measurement opening 136 is defined by planar sidewalls that run perpendicular to the holding channel bottom surface 138, and extend downward so as to create an opening through the arcuate fitting surface 120. The measurement opening 136 is also provided with rounded ends at each longitudinal edge of the opening. An end of the measurement opening 136 disposed furthest from the inserted surface 128 is disposed above the stop ridge 122 such that the stop ridge 122 includes an indent 140 to allow the measurement opening 136 an unobstructed path through the fixture arcuate surface 120. The indent 140 is shown in FIGS. 3 and 4.

Accordingly, the holding channel 126 is in communication with an area below (as illustrated) the arcuate fitting surface 120. As will be explained in further detail below, the measurement opening 136 allows the surface profiling device 106 to contact the cylinder sleeve 104 when the surface profiling device 106 is held in the holding channel 126 of the fixture 118 while the arcuate fitting surface 120 is flush against the cylinder sleeve 104.

Figure 6A:
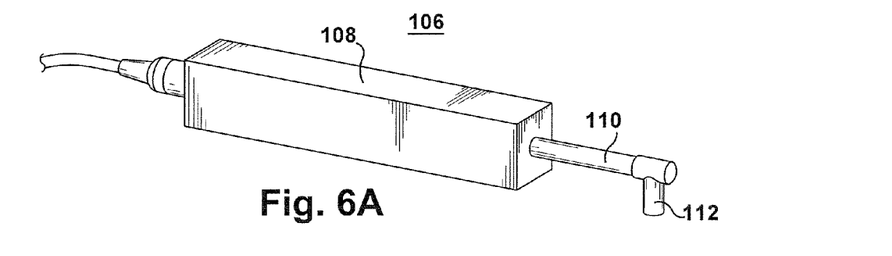
FIG. 6A is a perspective view of the surface profiling device.
Figure 6B:
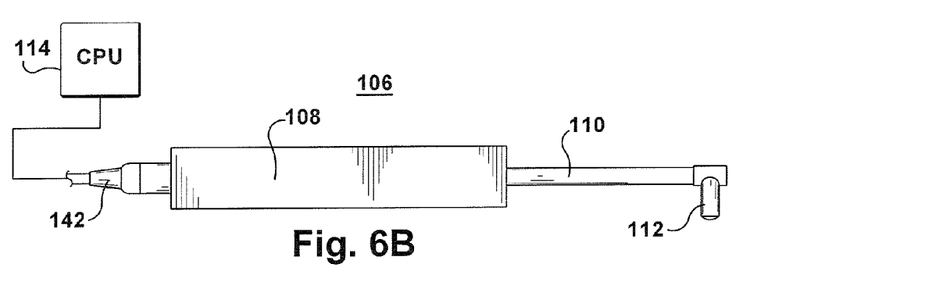
FIG. 6B is a side view of the surface profiling device having a measuring arm maximally extended.
Figure 6C:
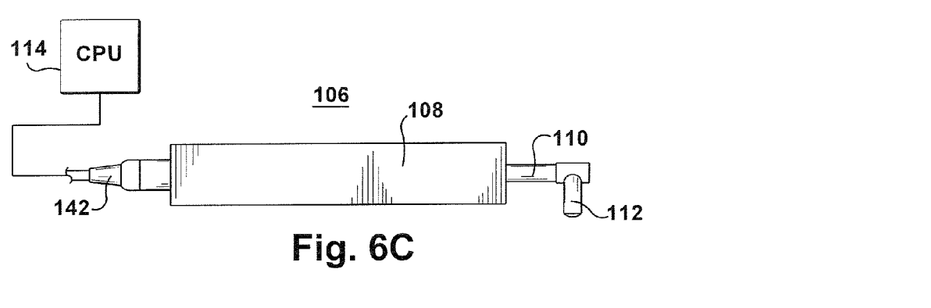
FIG. 6C is a side view of the surface profiling device having a measuring arm minimally extended.
Figure 6D:
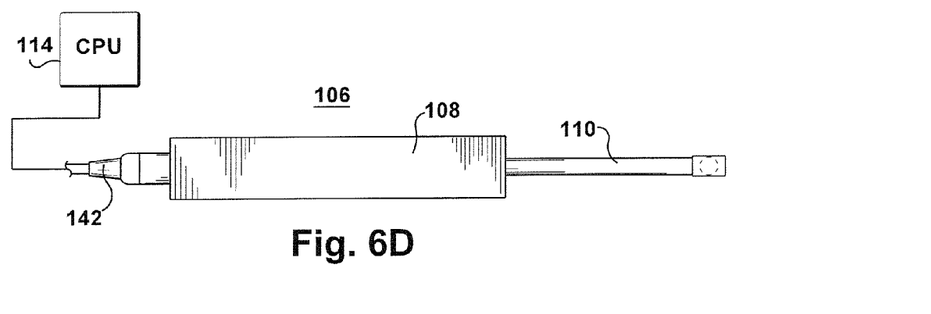
FIG. 6D is a plan view of the surface profiling device.

As mentioned, the fixture 118 is configured to hold the surface profiling device 106. With reference to FIGS. 6A-6B, the configuration of the surface profiling device 106 will be explained in further detail. The illustrated surface profiling device 106 principally includes the base member 108, the measuring arm 110, the stylus 112, the CPU 114, and a cable 142. The base member 108 is a rectangular body that slidably supports the measuring arm 110. The measuring arm 110 is a cylindrical arm that is slidably received in the base member 108 so as to project a variable amount therefrom. To allow for the variable projection from the base member 108, the measuring arm 110 is partially received in the base member 108. As shown in FIGS. 6B and 6C, the amount the measuring arm 110 projects from the base member 108 can be changed. Generally, this operation is controlled through some form of pneumatic control, through other controls, such as hydraulic or electric, can be used.

The stylus 112 is supported at an end of the measuring arm 110 opposed to the base member 108. The stylus 112 projects orthogonally from the measuring arm 110 and is configured to detect and measure a surface roughness, especially a surface roughness of the cylinder sleeve 104. As will be appreciated with reference to the description of the operation of the assembly 116, by changing the amount of the measuring arm 110 projecting from the base member 108, the stylus 112 is capable of measuring the surface roughness of the cylinder sleeve 104 at different longitudinal depths.

To control the surface profiling device 106, the base member 108 is connected to the CPU 114 through the cable 142. Accordingly, the CPU 114 can control the amount of projection of the measuring arm 110 so as to have the stylus 112 measure surface roughness along different longitudinal depths of the cylinder sleeve 104. Further, the cable allows readings from the stylus 112 to be communicated from the stylus 112 to the CPU 114. As such, the CPU 114 can receive and store the readings, and a surface roughness analysis can be conducted to determine whether the surface roughness of the cylinder sleeve 104 meets specifications.

With reference to FIGS. 7 and 8, the illustrated assembly 116 including the surface profiling device 106 held in the fixture 118 is shown. The surface profiling device base member 108 is received in the fixture holding channel 126 such that a bottom surface of the base member 108 is flush with the holding channel bottom surface 138. As mentioned, the base member 108 is a rectangular body and the fixture holding channel 126 is a rectangular indent. Preferably, the width of the holding channel bottom surface 138 is substantially identical to the width of the base member 108 such that the base member 108 is securely held in the fixture holding channel 126. Further, additional securing mechanisms can be used to ensure that the surface profiling device 106 is stationarily held in the holding channel 126. Examples of the securing mechanisms include, but are not limited to, mechanical fasteners (nuts and bolts) and adhesives.

The base member 108 is received in the fixture holding channel 126 such that, when the measuring arm 110 is minimally projected from the base member 108, as shown in FIG. 6C, the end of the measuring arm 110 supporting the stylus 112 is disposed directly above the measurement opening 136. Accordingly, even when the measuring arm 110 is minimally projected from the base member 108, the stylus 112 still passes through the measurement opening 136 when the surface profiling device 106 is held by the fixture 118. Preferably, the base member 108 is mounted such that when the measuring arm 110 is minimally projected, the stylus 112 is as near to the end of the measuring opening 136 adjacent the operating portion 134 as possible while keeping the stylus orthogonally projected through the measurement opening 136. Such a configuration allows a maximum range of motion of the stylus 112 in the longitudinal direction.

Further, the assembly 116 has a rear end of the base member 108 protruding from the fixture 118, where the rear end of the base member 108 is the end spaced from the end of the base member 108 from which the measuring arm 110 projects. This configuration allows the operator to more easily hand operate the assembly 116 by providing a narrow grip area. However, the fixture operating portion 134 can be extended such that the operated surface 130 is flush with, or extends beyond, the rear end of the base member 108.

Moreover, it is noted that a height of the measurement opening 136, defined as a height from the holding channel bottom surface 138 to a bottom of the arcuate fitting surface 120, is less than a height of the stylus 112. As used herein, the height of the stylus is defined as a distance between a lower tip of the stylus 112 and the measuring arm 110. Accordingly, when the surface profiling device 106 is held in the fixture 118, the stylus 112 projects through the measurement opening 136 such that a lower end of the stylus 112 is disposed below the arcuate fitting surface 120. This allows the stylus 112 to make contact with the cylinder sleeve 104. Accordingly, the assembly 116 can measure the roughness of the cylinder sleeve 104 when the inserting portion 132 is inserted into the cylinder sleeve 104 by having the stylus 112 pass through the measurement opening 136 to make contact with the cylinder sleeve 104. Further, by adjusting the relative height of the stylus 112 relative to the height of the measurement opening 136, a contact pressure between the stylus 112 and the cylinder sleeve 104 can be adjusted.

Figures 9, 10:
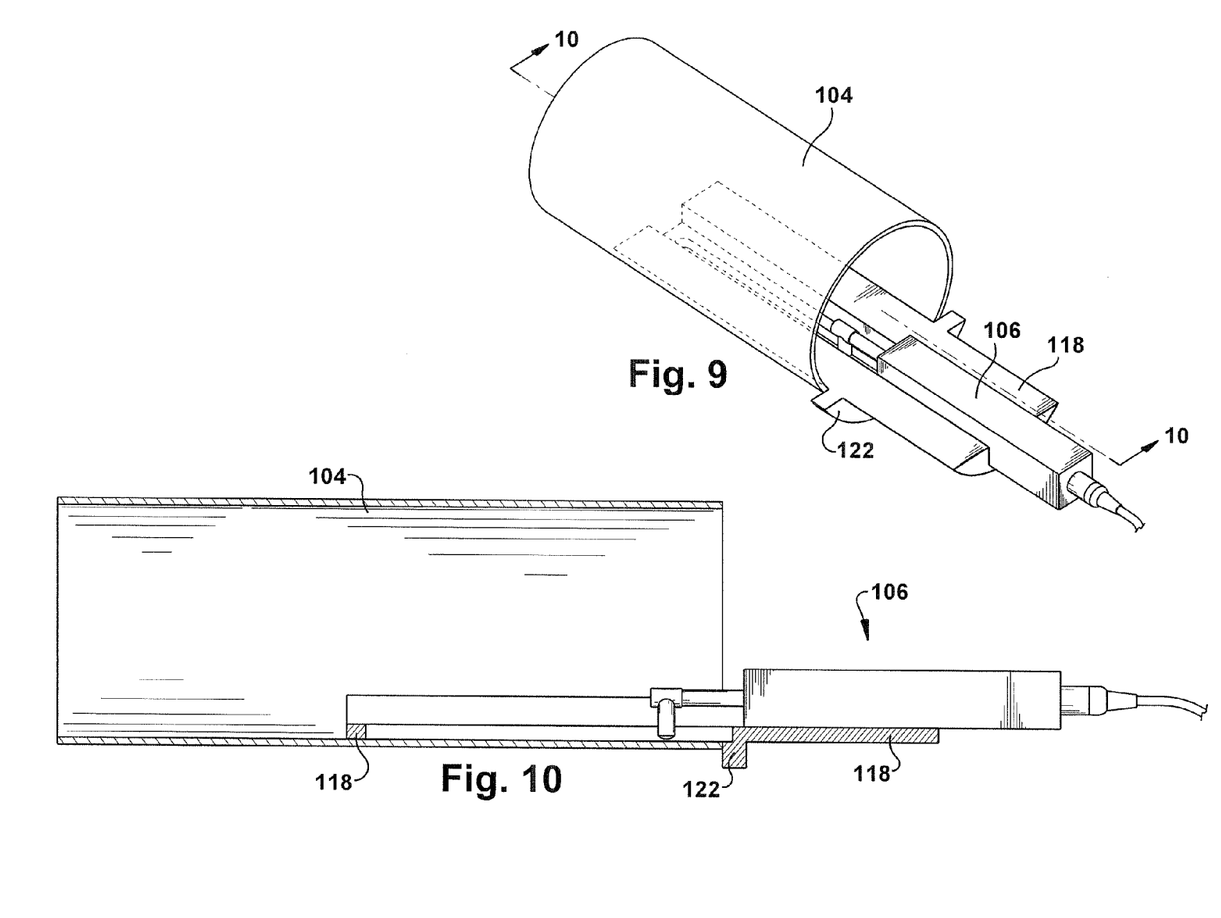
FIG. 9 is a perspective view illustrating the fixture holding the surface profiling device in operation measuring the surface roughness of the cylinder sleeve.
FIG. 10 is a sectional view along the line 10-10 shown in FIG. 9.

FIGS. 9 and 10 illustrate the assembly 116 in operation. Therein, the inserting portion 132 of the fixture 118 is inserted into the cylinder sleeve 104. As the assembly 116 is handheld, an operator grasps the fixture operating portion 134 and inserts the inserting portion 132 into the cylinder sleeve 104. As the surface profiling device 106 is held by the fixture 118, the surface profiling device 106 is also inserted into the cylinder sleeve 104. It is also noted that, to ensure accurate surface roughness measurement, it is preferable for the stylus 112 to perpendicularly contact the cylinder sleeve 104. To ensure that the stylus 112 constantly contacts the cylinder sleeve 104, the arcuate fitting surface 120 is curved at an angle matching that, or corresponding to that, of the cylinder sleeve 104.

Accordingly, the angle of the cylinder sleeve 104 is a circular angle defined by a set radius. To match the angle of the cylinder sleeve 104, the arcuate fitting surface 120 is defined by an arc that forms some fraction of the circle defining the cylinder sleeve 104. As shown in the embodiment presently being described, the arcuate fitting surface 120 defines an arc that is less than half of the circular cross section of the cylinder sleeve 104, e.g., less than a semi-circle.

Since the arcuate fitting surface 120 has an arc curved in a manner that matches the curve of the circular cross section of the cylinder sleeve 104, when the inserting portion 132 is inserted into the cylinder sleeve 104, the arcuate fitting surface 120 rests flush against the cylinder sleeve 104. Consequently, the holding channel bottom surface 138, the base member 108, and the measuring arm 110 are all disposed parallel to a longitudinal plane or direction of the cylinder sleeve 104. This causes the stylus 112, which perpendicularly projects from the measuring arm 110, to perpendicularly abut the cylinder sleeve 104.

When the assembly 116 is inserted into the cylinder sleeve 104, the stop ridge 122, which projects outwardly from the fixture 118, will abut the edges of the cylinder sleeve 104 so as to prevent further insertion of the fixture 118 into the cylinder sleeve 104 at a set point. Again, this set point corresponds to a demarcation between the fixture inserting portion 132 and the fixture operating portion 134. Accordingly, the stop ridge 122 ensures that only the inserting portion 132 of the fixture 118 is inserted into the cylinder sleeve 104. Conversely, the stop ridge 122 ensures that the operating portion 134 remains outside of the cylinder sleeve 104.

Moreover, by setting the surface profiling device 106 in a set position on the fixture 118, the stop ridge 122 operates to ensure that the surface profiling device stylus 112 operates within a predetermined and known longitudinal range. In other words, since the minimal and maximum projected positions of the measuring arm 110 relative to the base member 108 and fixture 118 are known, and the relative position of the fixture 118 and the cylinder sleeve 104 are known, the relative position of the stylus 112 on the measuring arm 110 can be known. Further, the stop ridge 122 assures that a sufficient portion of the assembly 116 is left outside of the cylinder sleeve 104 to allow for continued hand-held operation.

In operation, the operator will grasp the fixture operating portion 134 and move the assembly 116 toward the cylinder sleeve 104 that is to be measured. Then, the operator will place an end of the inserting portion 132 nearest the inserted surface 128 into the cylinder sleeve 104 such that the inserted portion of the arcuate fitting surface 120 is resting flush against the cylinder sleeve 104. The operator will then slide the assembly 116 further into the cylinder sleeve 104 until the fixture stop ridge 122 contacts the edge of the cylinder sleeve 104 and thereby prevents additional insertion of the assembly 116 into the cylinder sleeve 104.

At this point, the fixture inserting portion 132 has been inserted into the cylinder sleeve 104 and the fixture operating portion 134 is outside of the cylinder sleeve 104. Further, as the arcuate fitting surface 120 is flush against the cylinder sleeve 104, the stylus 112 is projecting through the measurement opening 136 and perpendicularly contacting the cylinder sleeve 104. From this contact, as the stylus 112 is moved across the surface of the cylinder sleeve 104, the stylus 112 will detect the roughness of the surface and communicate the results to the CPU 114 through the cable 142.

To move the stylus 112 along the cylinder sleeve 104, two separate moving operations are carried out. First, as mentioned above, the measuring arm 110 on which the stylus 112 is mounted is movable in a longitudinal direction relative to the cylinder sleeve 104 and the assembly 116. This movement is accomplished via instructions sent to the base member 108 from the CPU 114 that operate the measuring arm 110 movement mechanism.

Additionally, the operator can move the stylus 112 along the circular cross-section (in a transverse direction) by rotating the assembly 116 along the cylinder sleeve 104 by handling the operating portion 134. When so doing, the operator can ensure that the arcuate fitting surface 120 remains flush with the cylinder sleeve 104. By combining both moving operations, coupled with using the arcuate fitting surface 120 to ensure perpendicular contact between the stylus 112 and the cylinder sleeve 104, an accurate surface roughness measurement of the cylinder sleeve 104 can be ascertained.

The features of the assembly 116 have been described in a manner that allow sufficient operation of the assembly 116. However, it is noted that the assembly 116 can be altered in several respects while remaining within the spirit of the disclosure. Initially, the assembly 116 has been described as utilizing a surface profiling device 106 having a physical stylus 112. However, it will be appreciated that a surface profiling device using lasers or other means to measure a surface roughness can be substituted for the surface profiling device described above.

Further, the fixture 118 has been described as having an identical shape for both the inserting portion 132 and the operating portion 134. However, the assembly described herein is amenable to a fixture where the inserting and operating portions differ from one another. As an example, the operating portion can be configured to have a completely different shape than the inserting portion. For instance, the operating portion 134 can be provided with grip indents to allow an operator to more readily grip the operating portion. Alternatively, the operating portion can also include a handle to facilitate the operator's grip on the assembly.

Figure 11A:
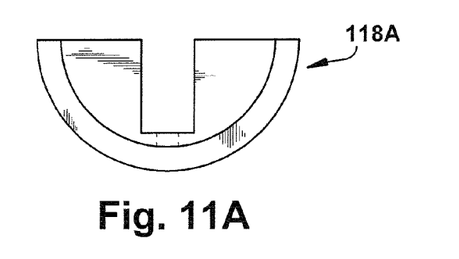
FIG. 11A illustrates a front view of a first alternate embodiment of the fixture for holding the surface profiling device.

Another modification includes adjusting the arc defined by the fixture arcuate surface. As described above, the fixture arcuate surface defines an arc that is less than a semi-circle, e.g., has an angle less than 180°. However, as shown in FIG. 11A, a fixture arcuate surface 118A can define a semi-circular arc with a 180° angle. As used herein, a semi-circular arc is a semi-circle defining an angle of 180°. Generally, with a hand-held assembly, keeping the arc defined by the arcuate surface between a semi-circle and a quarter of a circle allows for the best usage. Particularly, the arcuate surface has enough area to detectably remain flush with the cylinder sleeve, while not containing so much area that hand-held handling of the assembly becomes difficult.

Figures 11B, 11C, 11D:
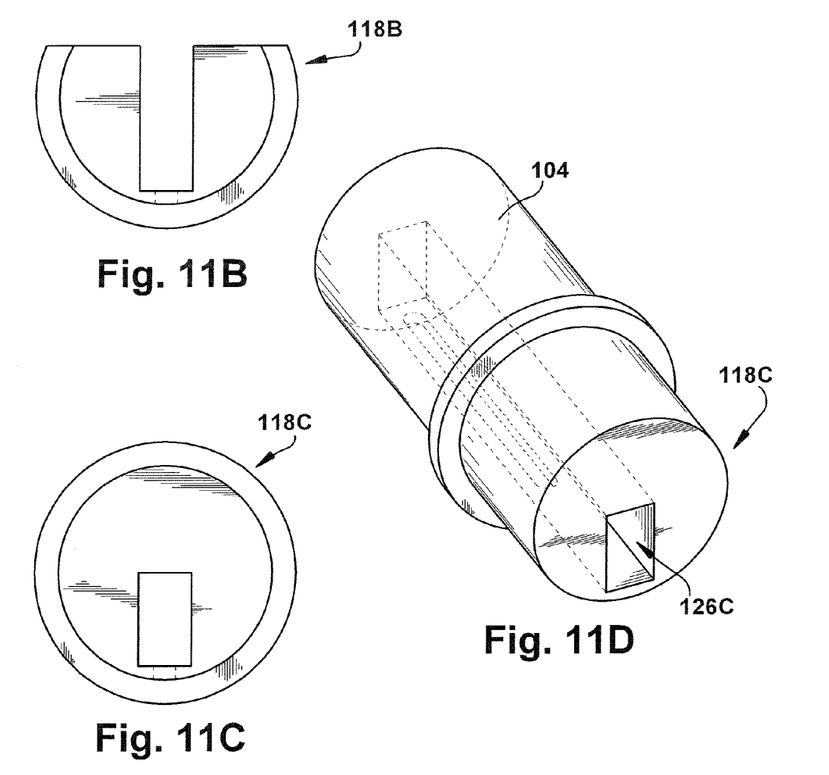
FIG. 11B illustrates a front view of a second alternate embodiment of the fixture for holding the surface profiling device.
FIG. 11C illustrates a front view of a third alternate embodiment of the fixture for holding the surface profiling device.
FIG. 11D illustrates a perspective view of the fixture for holding the surface profiling device according to the third alternate embodiment.

Further still, a fixture arcuate surface 118B can define an arc that is greater than a semi-circle, with an angle greater than 180° and less than 360°, as shown in FIG. 11B. Moreover, as illustrated in FIGS. 11C and 11D, an alternate fixture 118C can be provided that defines a cross section of a complete circle having a radius substantially equal to an inner radius of the cylinder sleeve 104. Such a circular fixture 118C requires a closed and centered holding channel 126C defining a rectangular cross-sectional shape.

Further, any of the above modifications can be combined with one another. For example, a fixture can include an operating portion consisting of a handle that is secured to a fully circular inserting portion. Accordingly, the inserting portion would resemble the fixture 118C, but would have a handle disposed on a non-inserted or operating portion thereof. It is also possible that the inserting portion of such an alternative embodiment would be rotatably secured through a spinning engine to the operating portion or handle. As such, the operator could insert the inserting portion into the cylinder sleeve and allow the inserting portion to spin through operation of the spinning engine secured thereto. While the inserting portion is being spun, the measuring arm would be extended and retracted such that the full surface roughness measurement can be undertaken.

The above are only a few possible modifications that could be made to the cylinder sleeve surface measurement assembly described herein. A person of ordinary skill in the art would recognize that there are several more modifications amenable to the disclosed assembly.

What is claimed is:

1. A cylinder sleeve measurement device, comprising:
   a surface profiling device; and
   a fixture holding the surface profiling device, wherein the fixture comprises:
   an arcuate fitting surface defining an arc corresponding to an arc defined by the cylinder sleeve such that the arcuate fitting surface rests flush against the arc defined by the cylinder sleeve; and
   a stop ridge orthogonally projecting from the arcuate fitting surface, the stop ridge adapted to abut an edge of the cylinder sleeve at a position outside of an interior of the cylinder sleeve so as to prevent further insertion of the fixture into the cylinder sleeve.

2. The cylinder sleeve measurement device according to claim 1, wherein the stop ridge is arcuate and defines an arc having a greater radius than the arcuate fitting surface.

3. The cylinder sleeve measurement device according to claim 1, wherein the fixture further comprises:
   an inserting end including at least a portion of the arcuate fitting surface; and
   an operating end adjacent to the inserting end and including at least a portion of a holding portion of the fixture, the holding portion adapted to hold the surface profiling device,
   wherein the stop ridge marks a demarcation between the inserting end and the operating end.

4. A cylinder sleeve measurement device, comprising:
   a surface profiling device; and
   a fixture holding the surface profiling device, wherein the fixture comprises:
   an arcuate fitting surface defining an arc corresponding to an arc defined by the cylinder sleeve such that the arcuate fitting surface rests flush against the arc defined by the cylinder sleeve; and
   a holding portion adapted to hold the surface profiling device, wherein the holding portion comprises a non-arcuate surface that is opposed to the arcuate fitting surface, the non-arcuate surface being formed of a pair of parallel planar surfaces separated by a recessed channel having a planar bottom surface, the recessed channel adapted to hold the surface profiling device.

5. The cylinder sleeve measurement device of claim 4, wherein the fixture includes:
   an elongated body adapted to have a portion thereof inserted into the cylinder sleeve.

6. The cylinder sleeve measurement device according to claim 5, wherein the fixture further comprises:
   an inserting end including at least a portion of the arcuate fitting surface;
   an operating end adjacent to the inserting end and including at least a portion of the holding portion; and
   a stop ridge projecting orthogonally from the arcuate fitting surface and marking a demarcation between the inserting end and the operating end.

7. The cylinder sleeve measurement device according to claim 4, wherein a measurement opening is defined through the bottom surface of the recessed channel and the arcuate fitting surface so as to allow the surface profiling device held in the recessed channel of the holding portion to communicate with the cylinder sleeve when the cylinder sleeve measurement device is inserted into the cylinder sleeve.

8. The cylinder sleeve measurement device according to claim 7, further comprising a stop ridge that orthogonally projects from the arcuate fitting surface.

9. The cylinder sleeve measurement device according to claim 8, wherein the surface profiling device comprises:
 a base member;
 a measuring arm projecting from the base member; and
 a stylus perpendicularly projecting from the measuring arm,
 wherein the measuring arm is slidably received by the base member so as to vary the distance between the base member and the stylus, and
 wherein the fixture is adapted to hold the surface profiling device such that the stylus perpendicularly contacts the cylinder sleeve through the measurement opening.

10. The cylinder sleeve measurement device according to claim 9, wherein the fixture further comprises:
 an inserting end including at least a portion of the arcuate fitting surface; and
 an operating end adjacent to the inserting end and including at least a portion of the holding portion,
 wherein the stop ridge orthogonally projecting from the arcuate fitting surface serves as a demarcation between the inserting end and the operating end.

11. The cylinder sleeve measurement device according to claim 8, wherein the fixture further comprises:
 an inserting end including at least a portion of the arcuate fitting surface; and
 an operating end adjacent to the inserting end and including at least a portion of the holding portion,
 wherein the stop ridge orthogonally projecting from the arcuate fitting surface serves as a demarcation between the inserting end and the operating end.

12. A cylinder sleeve measurement device comprising:
 a surface profiling device; and
 a fixture holding the surface profiling device,
 wherein the fixture includes an arcuate fitting surface defining an arc corresponding to an arc defined by the cylinder sleeve such that the arcuate fitting surface rests flush against the arc defined by the cylinder sleeve,
 wherein the surface profiling device comprises:
  a base member;
  a measuring arm projecting from the base member; and
  a stylus orthogonally projecting from the measuring arm,
  wherein the measuring arm is slidably received by the base member so as to vary the distance between the base member and the stylus, and
  wherein the fixture is adapted to hold the surface profiling device such that the stylus perpendicularly contacts the cylinder sleeve.

13. The cylinder sleeve measurement device according claim 12, wherein the arcuate fitting surface defines an arc that is less than a semi-circle.

14. The cylinder sleeve measurement device according to claim 12, wherein the arcuate fitting surface defines a semi-circular arc.

15. The cylinder sleeve measurement device according to claim 12, wherein the arcuate fitting surface defines an arc that is greater than a semi-circle and less than a full circle.

16. A cylinder sleeve measurement device according to claim 12, wherein the fixture comprises:
 a non-arcuate surface opposed to the arcuate fitting surface, the non-arcuate surface formed of a pair of parallel planar surfaces separated by a recessed channel having a planar bottom surface, the recessed channel adapted to hold the surface profiling device.

17. The cylinder sleeve measurement device according to claim 16, wherein a measurement opening is defined through the bottom surface of the recessed channel and the arcuate fitting surface so as to allow the stylus of the surface profiling device held in the recessed channel to communicate with the cylinder sleeve when the cylinder sleeve measurement device is inserted into the cylinder sleeve.

* * * * *